(12) United States Patent
Kim et al.

(10) Patent No.: US 10,969,162 B2
(45) Date of Patent: Apr. 6, 2021

(54) REFRIGERATOR AND METHOD FOR OPERATING THE REFRIGERATOR

(71) Applicant: LG ELECTRONICS INC., Seoul (KR)

(72) Inventors: Mi Rae Kim, Gunpo-si (KR); Sang Oh Kim, Seoul (KR); Seok Hyun Kim, Seoul (KR); Jun Sang Yun, Ansan-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/566,634

(22) Filed: Sep. 10, 2019

(65) Prior Publication Data

US 2020/0003482 A1 Jan. 2, 2020

(30) Foreign Application Priority Data

Jun. 28, 2019 (KR) .................. 10-2019-0077906

(51) Int. Cl.
| | |
|---|---|
| *F25D 29/00* | (2006.01) |
| *G06Q 10/08* | (2012.01) |
| *F25D 23/02* | (2006.01) |
| *G06K 9/00* | (2006.01) |

(52) U.S. Cl.
CPC ........... *F25D 29/00* (2013.01); *F25D 23/028* (2013.01); *G06K 9/00201* (2013.01); *G06Q 10/087* (2013.01); *F25D 2400/361* (2013.01); *F25D 2500/06* (2013.01); *F25D 2700/02* (2013.01); *F25D 2700/06* (2013.01)

(58) Field of Classification Search
CPC .. F25D 29/00; F25D 23/028; F25D 2400/361; F25D 2500/06; F25D 2700/02; F25D 2700/06; F25D 31/007; F25D 2400/30; F25D 2700/122; F25D 29/005; F25D 2700/04; G06K 9/00201; G06K 9/00671; G06K 9/00771; G06K 9/6256; G06K 2209/17; G06Q 10/087
See application file for complete search history.

(56) References Cited

U.S. PATENT DOCUMENTS

| | | | | |
|---|---|---|---|---|
| 2002/0109445 | A1* | 8/2002 | Sears ...................... | D06F 39/14 312/319.2 |
| 2018/0335252 | A1* | 11/2018 | Oh ......................... | F25D 29/005 |
| 2020/0088463 | A1* | 3/2020 | Jeong ..................... | F25D 29/00 |

FOREIGN PATENT DOCUMENTS

| | | |
|---|---|---|
| KR | 10-2007-0075669 A | 7/2007 |
| KR | 10-2008-0108686 A | 12/2008 |

* cited by examiner

*Primary Examiner* — Hai Phan
*Assistant Examiner* — Anthony D Afrifa-Kyei
(74) *Attorney, Agent, or Firm* — Birch, Stewart, Kolasch & Birch, LLP

(57) ABSTRACT

A refrigerator for controlling operations by executing artificial intelligence (AI) algorithms and/or machine learning algorithms in a 5G environment connected for Internet of Things, and a method of operating the refrigerator, are disclosed. A method for operating a refrigerator including performing by a controller, a first recognition of a first food being placed into the refrigerator, performing by the controller, a second recognition of a second food being taken out from the refrigerator, and displaying, on a display of the refrigerator, storage status information on remaining food in the refrigerator based on a result of the first recognition and a result of the second recognition is provided.

18 Claims, 8 Drawing Sheets

| REFRIGERATING COMPARTMENT | LEFT REFRIGERATING COMPARTMENT | RIGHT REFRIGERATING COMPARTMENT | ELAPSED NUMBER OF DAYS | SEE ALL |
|---|---|---|---|---|
| ITEM | | | | |
| SALAD | REFRIGERATING COMPARTMENT / RIGHT DOOR | | 11 DAYS PASSED | ... |
| CABBAGE | REFRIGERATING COMPARTMENT | | 10 DAYS PASSED | ... |
| STRAWBERRY JAM | REFRIGERATING COMPARTMENT / LEFT DOOR | | 38 DAYS STORED | ... |
| MUSTARD SAUCE | REFRIGERATING COMPARTMENT / LEFT DOOR | | 38 DAYS STORED | ... |
| ANCHOVY | REFRIGERATING COMPARTMENT / INSIDE | | 38 DAYS STORED | ... |
| BEAN PASTE | REFRIGERATING COMPARTMENT / INSIDE | | 38 DAYS STORED | ... |
| BEAN PASTE | REFRIGERATING COMPARTMENT / INSIDE | | 38 DAYS STORED | ... |
| JUJUBE | REFRIGERATING COMPARTMENT | | 38 DAYS STORED | ... |
| POMEGRANATE | REFRIGERATING COMPARTMENT | | 28 DAYS STORED | ... |
| MUSHROOM | REFRIGERATING COMPARTMENT | | 27 DAYS STORED | ... |

(b)

| FREEZER COMPARTMENT | LEFT FREEZER COMPARTMENT | RIGHT FREEZER COMPARTMENT | ELAPSED NUMBER OF DAYS | SEE ALL |
|---|---|---|---|---|
| ITEM | | | | |
| CHILI | LEFT FREEZER COMPARTMENT | | 38 DAYS STORED | ... |
| ANCHOVY | LEFT FREEZER COMPARTMENT | | 38 DAYS STORED | ... |
| SHRIMP | FREEZER COMPARTMENT / LEFT DOOR | | 38 DAYS STORED | ... |
| CHICKEN BREAST | LEFT FREEZER COMPARTMENT | | 32 DAYS STORED | ... |
| PERILLA LEAF | LEFT FREEZER COMPARTMENT | | 20 DAYS STORED | ... |
| RICE CAKE | LEFT FREEZER COMPARTMENT | | 17 DAYS STORED | ... |

FIG. 5

161(OR 200)

| REFRIGERATING COMPARTMENT | LEFT REFRIGERATING COMPARTMENT | RIGHT REFRIGERATING COMPARTMENT | |
|---|---|---|---|
| ITEM | | ELAPSED NUMBER OF DAYS | SEE ALL |
| SALAD REFRIGERATING COMPARTMENT / RIGHT DOOR | | 11 DAYS PASSED | ... |
| CABBAGE REFRIGERATING COMPARTMENT | | 10 DAYS PASSED | ... |
| STRAWBERRY JAM REFRIGERATING COMPARTMENT / LEFT DOOR | | 38 DAYS STORED | ... |
| MUSTARD SAUCE REFRIGERATING COMPARTMENT / LEFT DOOR | | 38 DAYS STORED | ... |
| ANCHOVY REFRIGERATING COMPARTMENT / INSIDE | | 38 DAYS STORED | ... |
| BEAN PASTE REFRIGERATING COMPARTMENT / INSIDE | | 38 DAYS STORED | ... |
| BEAN PASTE REFRIGERATING COMPARTMENT | | 38 DAYS STORED | ... |
| JUJUBE REFRIGERATING COMPARTMENT | | 28 DAYS STORED | ... |
| POMEGRANATE REFRIGERATING COMPARTMENT | | 27 DAYS STORED | ... |
| MUSHROOM REFRIGERATING COMPARTMENT | | | |

— 406

408

(a)

407

161(OR 200)

◀ EDIT FOOD INFORMATION

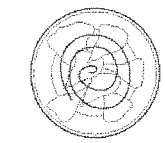

FOOD NAME  SALAD
ELAPSED NUMBER OF DAYS  38

INPUT DATE        2019-11-14
WARNING DATE      2019-12-11
ALARM DATE
STORED LOCATION   REFRIGERATING COMPARTMENT ▶   INSIDE ▶
NOTE
x x x

| ::  FOOD MANAGEMENT | | 161(OR 200)  410 411  🔍 ➕ |
|---|---|---|
| FOOD TYPE ⬍ | | GENERATION DATE ⬍ |
| ☐ | 🍌 BANANA | 2019-11-29 |
| ☐ | 🍞 BREAD | 2019-11-29 |
| ☐ | 🥬 ARONIA | 2019-11-20 |
| ☐ | 🥬 CABBAGE | 2019-11-29 |
| ☐ | 🐟 SALMON | 2019-12-10 |
| ☐ | 🥛 MILK | 2019-11-20 |
| ☐ | 🍶 CHILI SAUCE | 2019-11-29 |
| ☐ | 🌱 BEAN SPROUTS | 2019-11-29 |
| ☐ | 🍅 TOMATO | 2019-11-29 |

(a)

| ::  FOOD MANAGEMENT | | 161(OR 200)  🔍 ➕ |
|---|---|---|
| FOOD TYPE ⬍ | | GENERATION DATE ⬍ |
| ☐ | 🍌 BANANA | 2019-11-29 |
| ☐ | 🍞 BREAD | 2019-11-29 |
| ☐ | 🥬 ARONIA | 2019-11-20 |
| ✓ | 🥬 CABBAGE | 2019-11-29 |
| ☐ | 🐟 SALMON | 2019-12-10 |
| ✓ | 🥛 MILK | 2019-11-20 |
| ☐ | 🍶 CHILI SAUCE | 2019-11-29 |
| ☐ | 🌱 BEAN SPROUTS | 2019-11-29 |
| ☐ | 🍅 TOMATO | 2019-11-29 |
| | 413 | 414 ORDER |

(b)

REFRIGERATOR AND METHOD FOR OPERATING THE REFRIGERATOR

CROSS-REFERENCE TO RELATED APPLICATION

This present application claims benefit of priority to Korean Patent Application No. 10-2019-0077906, entitled "REFRIGERATOR AND METHOD FOR OPERRATING THE REFRIGERATOR," filed on Jun. 28, 2019, in the Korean Intellectual Property Office, the entire disclosure of which is incorporated herein by reference.

BACKGROUND

1. Technical Field

The present disclosure relates to a refrigerator and a method for operating the refrigerator. More particularly, the present disclosure relates to a refrigerator capable of checking the management status of food, including putting in and taking out food, by using voice and image recognition, and a method for operating the refrigerator.

2. Description of Related Art

Generally, a refrigerator is a home appliance that allows low-temperature storage of food in an internal storage space that is shielded by a door. To this end, the refrigerator is configured to cool the inside of the storage space using cool air generated through heat exchange with refrigerants circulating in a refrigeration cycle, to thereby maintain the stored food in an optimal state.

Recently, refrigerators have become bigger and multi-functional in accordance with changes in diet and a trend of an increase in high quality products, and refrigerators having various structures and convenience features for user convenience and efficient use of the internal space have been introduced.

The storage spaces of a refrigerator can be opened or closed by doors. The refrigerators can be classified into various types according to the layout of the storage spaces and the structure of the doors that open and close the storage spaces.

Korean Patent Application Publication No. 10-2008-0108686 (hereinafter referred to as "Related Art 1") discloses a technology in which a viewing window for allowing a user to observe the inside of a refrigerator operates in conjunction with an inner lamp, and the viewing window automatically switches from a transparent state to an opaque state after a predetermined amount of time passes.

Korean Patent Application Publication No. 10-2007-0075669 (hereinafter referred to as "Related Art 2") discloses a technology providing a mode for adjusting a supercooling degree of a liquid beverage stored in a refrigerator, thus allowing a user to select and adjust the supercooling degree according to his or her preference or the type of liquid beverage.

However, in the case of Related Art 1 and Related Art 2, the management information of the food stored in the refrigerator (for example, information on the type of food, the storage start date of the food, the elapsed number of days of storage of the food, and the date of removing the food) cannot be delivered to the user.

The above description regarding the related art is technical information that the inventor holds for the derivation of the present disclosure or acquired in the process of deriving the present disclosure, and is not necessarily a known technology disclosed to the general public prior to the filing of the present disclosure.

(Related Art 1) Korean Patent Application Publication No. 10-2008-0108686 (published on Dec. 16, 2008)

(Related Art 2) Korean Patent Application Publication No. 10-2007-0075669 (published on Jul. 24, 2007)

SUMMARY OF THE INVENTION

The present disclosure is directed to easily recognizing food which is put into and taken out from a refrigerator by using a voice recognition function and an image recognition function.

The present disclosure is further directed to outputting storage status information of food inside a refrigerator.

The present disclosure is still further directed to outputting an elapsed number of days of storage of food inside a refrigerator, to thereby induce consumption of fresh food.

The present disclosure is still further directed to outputting storage status information of food inside a refrigerator to a user terminal, to thereby allow a user to check the food storage status of the refrigerator anytime and anywhere.

The present disclosure is still further directed to providing convenience to a user by allowing food taken out from a refrigerator to be purchased for the user.

The present disclosure is still further directed to providing a recipe based on food taken out from a refrigerator, to thereby improve user convenience.

The present disclosure is still further directed to automatically setting and operating an operation mode of an electronic cooking appliance interworking with a refrigerator via a network, to thereby improve user convenience.

The present disclosure is not limited to what has been described above, and other aspects and advantages of the present disclosure will be understood by the following description and become apparent from the embodiments of the present disclosure. Aspects and advantages of the invention may be realized by the means shown in claims and combinations thereof.

A method for operating a refrigerator according to an embodiment of the present disclosure may include checking a management status of food, including a situation of food which is put into and taken out from a refrigerator, by using a voice and image recognition.

Specifically, the method for operating a refrigerator according to an embodiment of the present disclosure may include performing a first recognition of food that is put into the refrigerator, performing a second recognition of food that is taken out from the refrigerator, and displaying storage status information on food in the refrigerator based on a result of the first recognition and a result of the second recognition.

By employing the method for operating a refrigerator according to this embodiment of the present disclosure, food which is put into and taken out from a refrigerator can be easily recognized by using a voice recognition function and an image recognition function, thereby improving user convenience in using a refrigerator. Further, storage status information about food inside a refrigerator can be outputted, thereby allowing a user not to forget to consume food that has been stored for a long time.

Further, the performing of the first recognition may include sensing opening of a door of the refrigerator and activating an image recognition function and a voice recognition function, acquiring a photographed image of food which is put into the refrigerator, estimating a type of the food represented by the photographed image by using a first deep neural network which has been trained in advance to determine food types through images, outputting a spoken utterance inducement signal when estimation of the type of the food fails, receiving a first spoken utterance signal relating to the type of the food in response to the spoken utterance inducement signal, recognizing the type of the food represented by the first spoken utterance signal by using a second deep neural network which has been trained in advance to determine food types through voice, sensing closing of the door of the refrigerator, and outputting information indicating that the recognized type of the food has been stored in the refrigerator.

By performing the first recognition according to the present embodiment, food which is put into and taken out from a refrigerator can be easily recognized by using a voice recognition function and an image recognition function.

Further, the performing of the first recognition may include sensing opening of a door of the refrigerator, acquiring a photographed image of the food, sensing closing of the door of the refrigerator, and outputting information indicating that the food has been stored in the refrigerator.

By performing the first recognition according to the present embodiment, food which is put into and taken out from a refrigerator can be easily recognized by using an image recognition function.

Further, the performing of the first recognition may include sensing opening of a door of the refrigerator, outputting voice recognition function activation status information, receiving a first spoken utterance of a user indicating that the food is being stored in the refrigerator, sensing closing of the door of the refrigerator, and outputting information indicating that the food has been stored in the refrigerator.

By performing the first recognition according to the present embodiment, food which is put into and taken out from a refrigerator can be easily recognized by using voice recognition function.

Further, the performing of the first recognition may include sensing opening of a door of the refrigerator, urging a user to open only one door when a plurality of doors of the refrigerator have been opened, recognizing food that is put into the refrigerator, sensing that all doors of the refrigerator have been closed, and determining information on a location where the food has been put, according to a location of a door that was last closed in the refrigerator.

By performing the first recognition according to the present embodiment, an accurate location where food is stored can be recognized according to the location of an opened door, even in the case of a refrigerator having side by side doors.

Further, the performing of the second recognition may include sensing opening of a door of the refrigerator, receiving a second spoken utterance of a user indicating that the food is being taken out from the refrigerator, sensing closing of the door of the refrigerator, and outputting information indicating that the food has been taken out from the refrigerator.

By performing the second recognition according to the present embodiment, food which is taken out from the refrigerator can be accurately recognized by using a voice recognition function.

Further, the performing of the second recognition may include sensing opening of a door of the refrigerator, acquiring a first image which is generated by photographing an inside of the refrigerator when the door of the refrigerator is opened, sensing closing of the door of the refrigerator, acquiring a second image which is generated by photographing the inside of the refrigerator after the door of the refrigerator is closed, comparing the first image with the second image, determining the food that has been taken out from the refrigerator based on a difference which is checked through the comparison of the first image and the second image, and outputting information indicating that the food has been taken out from the refrigerator.

By performing the second recognition according to the present embodiment, food which is taken out from the refrigerator can be accurately recognized by using an image recognition function.

Further, the performing of the second recognition may include sensing opening of a door of the refrigerator, outputting voice recognition function activation status information, receiving a second spoken utterance of a user indicating that the food is being taken out from the refrigerator, sensing closing of the door of the refrigerator, and outputting information indicating that the food has been taken out from the refrigerator.

By performing the second recognition according to the present embodiment, food which is taken out from the refrigerator can be accurately recognized by using a voice recognition function.

Further, the displaying may include displaying storage status information on the food, including at least one among a storage location of the food in the refrigerator, a list of the food, and an elapsed number of days since the food was initially stored.

By employing the displaying operation according to the present embodiment, the storage status information about food inside a refrigerator can be outputted, thereby allowing a user not to forget to consume food that has been stored for a long time.

Further, the displaying may include displaying a list of the food in which an elapsed number of days since the food was initially stored are sorted in ascending or descending order.

By employing the displaying operation according to the present embodiment, the elapsed number of days of storage of food inside a refrigerator can be outputted, thereby inducing consumption of fresh food.

Further, the displaying may include receiving a signal indicating that a terminal registered in the refrigerator is located at a predetermined specific location or a signal indicating that the terminal is connected to a predetermined specific website by communicating with the terminal, and transmitting, to the terminal, storage status information about the food.

By employing the displaying operation according to the present embodiment, the user can check the food storage status of the refrigerator anytime and anywhere.

Further, the method may further include, when at least one of the performing of the first recognition and the performing of the second recognition is completed, updating storage status information on the food.

By employing the updating operation according to the present embodiment, the user can check up-to-date storage status information on the food, which allows for convenient food management.

A refrigerator according to another embodiment of the present disclosure may include a first recognition unit configured to perform a first recognition of recognizing food that is put into the refrigerator, a second recognition unit configured to perform a second recognition of recognizing food that is taken out from the refrigerator, and a display processing unit configured to display storage status information on food in the refrigerator based on a result of the first recognition and a result of the second recognition.

By employing a refrigerator according this embodiment of the present disclosure, food which is put into and taken out from a refrigerator can be easily recognized, thereby improving user convenience in using a refrigerator, and the storage status information about food inside a refrigerator can be outputted, thereby allowing a user not to forget to consume food that has been stored for a long time.

Further, the first recognition unit may be configured to acquire a photographed image of food which is put into the refrigerator and estimate a type of the food represented by the photographed image by using a first deep neural network which has been trained in advance to determine food types through images, output a spoken utterance inducement signal when estimation of the type of the food fails, and recognize the type of the food represented by a first spoken utterance signal corresponding to the received spoken utterance inducement signal by using a second deep neural network which has been trained in advance to determine food types through voice.

By employing the first recognition unit according to the present embodiment, food which is put into and taken out from a refrigerator can be easily recognized by using a voice recognition function and an image recognition function.

Further, the first recognition unit may be configured to sense opening of a door of the refrigerator, urge a user to open only one door when a plurality of doors of the refrigerator have been opened, recognize food that is put into the refrigerator, sense that all doors of the refrigerator have been closed, and determine information on a location where the food has been put, according to a location of a door that was last closed in the refrigerator.

By employing the first recognition unit according to the present embodiment, an accurate location where food is stored can be recognized according to the location of an opened door even in the case of a refrigerator having side by side doors.

Further, the second recognition unit may be configured to acquire a first image which is generated by photographing an inside of the refrigerator when the door of the refrigerator is opened, acquire a second image which is generated by photographing an inside of the refrigerator after the door of the refrigerator is closed, compare the first image with the second image, and determine the food that has been taken out from the refrigerator, based on a difference which is checked through the comparison of the first image and the second image.

By employing the second recognition unit according to the present embodiment, food which is put into and taken out from a refrigerator can be easily recognized by using an image recognition function.

Further, the display processing unit may display storage status information on the food, including at least one among a storage location of the food in the refrigerator, a list of the food, and an elapsed number of days since the food was initially stored.

By employing the display processing unit according to the present embodiment, the storage status information about food inside a refrigerator can be outputted, thereby allowing a user not to forget to consume food that has been stored for a long time.

Further, the display processing unit may display a list of the food in which an elapsed number of days since the food was initially stored are sorted in ascending or descending order.

By employing the display processing unit according to the present embodiment, an elapsed number of days of storage of food inside a refrigerator can be outputted, thereby inducing consumption of fresh food.

Further, the refrigerator may further include a communication unit communicating with a terminal registered in the refrigerator, and when receiving, from the terminal, a signal indicating that the terminal is located at a predetermined specific location or a signal indicating that the terminal is connected to a predetermined specific website, the communication unit may transmit, to the terminal, storage status information about the food.

By employing the communication unit according to the present embodiment, the user can check the food storage status of the refrigerator anytime and anywhere.

In addition, other methods and systems for implementing the present disclosure, and a computer program for executing such methods, may be provided.

Other aspects, features, and advantages will become apparent from the following drawings, claims, and detailed description of the invention.

According to the present disclosure, food which is put into and taken out from a refrigerator can be easily recognized by using a voice recognition function and an image recognition function, thereby improving user convenience in using a refrigerator.

In addition, the storage status information about food inside a refrigerator can be outputted, thereby allowing a user not to forget to consume food that has been stored for a long time.

In addition, an elapsed number of days of storage of food inside a refrigerator can be outputted, thereby inducing consumption of fresh food.

In addition, storage status information of food inside a refrigerator can be outputted to a user terminal, thereby allowing a user to check the food storage status of the refrigerator anytime and anywhere.

In addition, user convenience is improved by allowing food taken out from a refrigerator to be purchased for the user.

In addition, a recipe based on food taken out from a refrigerator can be provided, thereby improving user convenience.

In addition, it is possible to automatically set and operate an operation mode of an electronic cooking appliance interworking with a refrigerator via a network, thereby improving user convenience.

In addition, although a refrigerator is a mass-produced and uniform product, a user may perceive the refrigerator as a personalized device, and thereby may experience the effect of having a user-customized product.

The effects of the present disclosure are not limited to those mentioned above, and other effects not mentioned can be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which:

FIGS. 4 to 6 illustrate storage status and a purchase of food in a refrigerator.

DETAILED DESCRIPTION

Figure 1:
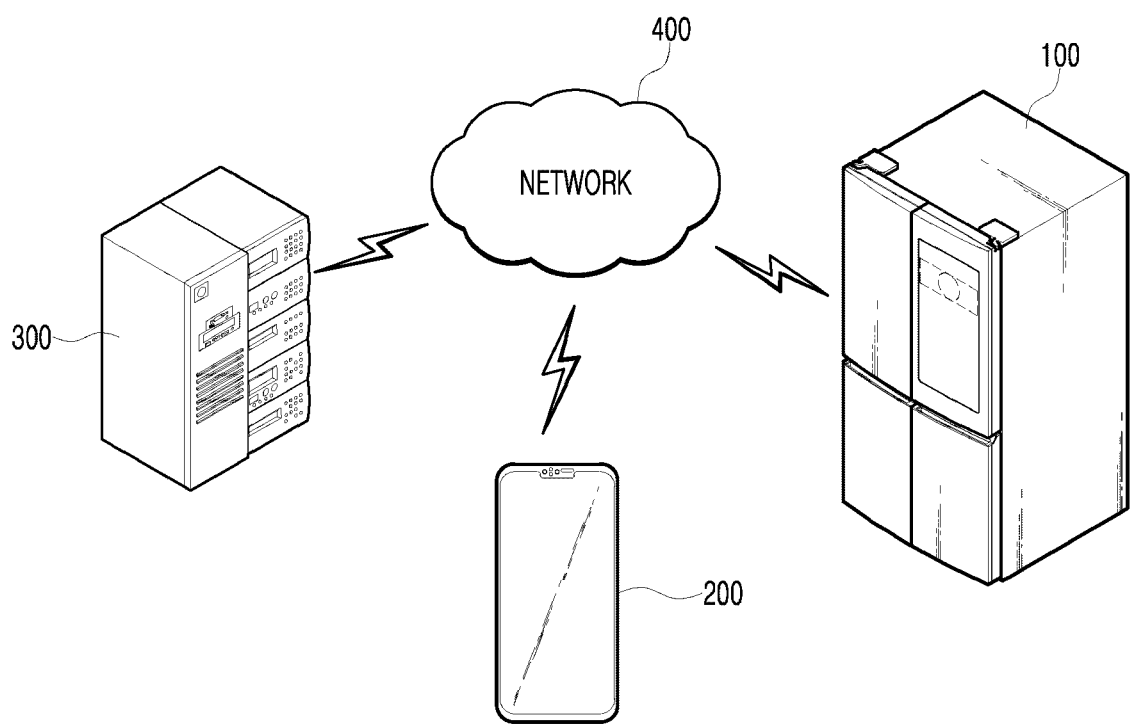
FIG. 1 illustrates a refrigerator control environment including a refrigerator, a user terminal, a server, and a network connecting them according to an embodiment of the present disclosure.

The advantages and features of the present disclosure, and the method of achieving them, will be apparent from the embodiments described below together with the attached drawings. It should be understood, however, that the present disclosure is not limited to the embodiments set forth herein, but may be embodied in many different forms and should be understood as including all conversions, equivalents, and alternatives falling within the spirit and scope of the present disclosure. The embodiments described below complete the present disclosure and are provided to let those skilled in the art completely understand the scope of the disclosure. If it is determined that a specific description about the related art may make the gist of the present disclosure unclear, the detailed description thereof will be omitted.

The terminology used in this application is used only to describe a specific embodiment and is not intended to limit the present disclosure. The singular expressions include plural expressions unless the context clearly dictates otherwise. In the present application, the terms "include" or "have" and the like are used to specify that there are features, numbers, steps, operations, elements, components or combinations thereof described in the specification, but do not preclude the presence or addition of one or more other features, integers, steps, operations, elements, components, or combinations thereof. The terms "first", "second", etc. may be used to describe various elements, but the elements should not be limited by terms. Terms are used only for the purpose of distinguishing one element from another.

Hereinafter, embodiments according to the present disclosure will be described in detail with reference to the accompanying drawings, and in the following description with reference to the accompanying drawings, the same or corresponding components are denoted by the same reference numerals, and a duplicate description thereof will be omitted.

Figure 2:
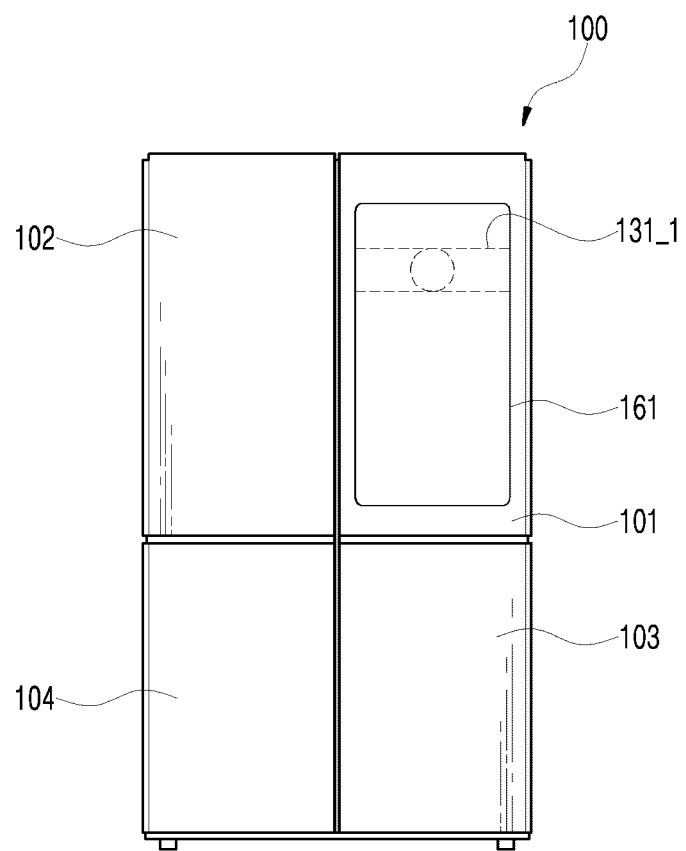
FIG. 2 is a front view of a refrigerator according to an embodiment of the present disclosure.

FIG. 1 illustrates a refrigerator control environment including a refrigerator, a user terminal, a server, and a network connecting them according to an embodiment of the present disclosure, and FIG. 2 is a front view of a refrigerator according to an embodiment of the present disclosure. Referring to FIGS. 1 and 2, a refrigerator control environment 1 may include a refrigerator 100, a user terminal 200, a server 300, and a network 400.

The refrigerator 100 is a home appliance that can store food at a low temperature in an internal storage space that is shielded by a first door 101 to a fourth door 104. The refrigerator is configured to cool the inside of the storage space using cool air generated through heat exchange with refrigerants circulating in a refrigeration cycle, to thereby maintain the stored food in an optimal state.

The first door (right door) 101 and a second door (left door) 102 of the refrigerator 100 may be refrigerating compartment doors for opening and closing the refrigerating compartment, and a third door (right door) 103 and the fourth door (left door) 104 may be freezer compartment doors for opening and closing the freezer compartment. The first door 101 and the second door 102, as refrigerating compartment doors, may be opened and closed by rotating a front part of the refrigerating compartment, and the third door 103 and the fourth door 104 as the freezer compartment doors may be opened and closed by rotating a front part of the freezer compartment. In the present embodiment, the third door 103 and/or the fourth door 104 may be configured to be drawable in the form of a drawer when necessary, and may be provided as a single door or as one or more doors.

In the embodiment of the present disclosure, a refrigerator having French-type doors is described as an example, in which a pair of doors are turned and opened and closed in a bottom freezer-type refrigerator in which a freezing compartment is provided in the bottom part of the refrigerator, but the present disclosure may be applied to any type of refrigerator in which a door is provided, regardless of the shape of the refrigerator.

A control panel (120 in FIG. 3), a first image sensor (131_1 in FIG. 3), and a display (161 in FIG. 3) may be included in the first door 101, which is a door at one side among the first door 101 and the second door 102. The control panel 120 and the display 161 may be provided as a single module display device, and may be disposed so as to be exposed to the front surface of the first door 101. Further, the first image sensor 131 may be disposed on one side of the display 161.

The display 161 is used to display operation information of the refrigerator 100, and may display the temperature information of the inside of the refrigerator 100, and may display set functions as characters or pictures. The control panel 120 may be provided on one side adjacent to the display 161, and may include a sensor, a button, or a switch structure capable of recognizing a user's touch or pressing operation. The temperature of the refrigerator 100 and the selection of various functions can be set by the manipulation of the control panel 120.

In addition, a viewing unit (not shown), which allows a user to observe the storage space behind the second door 102 and/or the space inside the refrigerator 100, may be formed on, for example, the second door 102, which is a door at the other side among the first door 101 and the second door 102. The viewing unit may constitute at least a part of the front surface of the refrigerating compartment door. The viewing unit may become selectively transparent or opaque depending on the user's manipulation, and the food stored in the refrigerator 100 may be accurately identified through the viewing unit.

Further, the first door 101 among the first door 101 and the second door 102 may be configured to be opened and closed in a double manner. In detail, the first door 101 may include a main door (not shown) for opening and closing the refrigerating compartment, and a sub-door (not shown) for opening and closing an opening formed in the main door. The main door may have the same size as the second door 102, and may be rotatably supported by an upper hinge (not shown) and a lower hinge (not shown), to thereby open and close at least a part of the refrigerating compartment.

The first door 101 to the fourth door 104 are rotatably installed in a cabinet, and at least one gasket may be provided between each of the first door 101 to the fourth door 104 and the cabinet. When the first door 101 to the fourth door 104 are closed, the gasket is brought into close contact with each of the first door 101 to the fourth door 104, thereby preventing the cold air of the refrigerating compartment and the freezer compartment from being leaked. As the adhesion force of such a gasket is increased, the effect of preventing cold air leakage can be increased. In order to increase the adhesion force of the gasket, the gasket may be formed of a rubber magnet, and a magnet may be provided in the gasket. When the user pulls the door with a force greater than the adhesion force of the gasket, the magnetic force of the gasket, and the elastic force of a spring, one of the first door 101 to the fourth door 104 may be opened.

In an alternative embodiment, one of the first door 101 to the fourth door 104 may be automatically opened or closed by a simple touch of the user to one of the first door 101 to the fourth door 104, or by a voice command of the user. The first door 101 to the fourth door 104 may further include a door opening/closing module (not shown) in order to automatically open or close the door. The door opening/closing module may include a motor, a plurality of gears, and a rack. The motor is driven in a first direction or a second direction under the control of a controller (180 in FIG. 3), the gear is driven by the driving of the motor, and the driving force of the motor is transmitted to the rack through the gear to thereby open or close the door.

In order to automatically open or close one of the first door 101 to the fourth door 104 by a simple touch of the user, the controller 180, which senses the operation of a touch sensor (included in 132 of FIG. 3) provided on the door, may operate the door opening/closing module. Further, in order to automatically open or close any one of the first door 101 to the fourth door 104 by a voice command of the user, a voice recognition module (190 of FIG. 3), which has received the user's voice (for example, "Open the left refrigerating compartment door" or "Open the right freezer compartment door"), may transmit the result of voice recognition to the controller 180, and the controller 180 may operate the door opening/closing module.

In the present embodiment, the refrigerator 100 may perform a first recognition of recognizing the food that is put into the refrigerator 100, perform a second recognition of recognizing the food to be taken out from the refrigerator 100, and display storage status information on the food inside the refrigerator based on the result of the first recognition and the result of the recognition. Here, the display of the storage status for the food may be performed at the request of the user. The refrigerator 100 may update the storage status information about the food when the performance of at least one of the first recognition and the second recognition is completed.

In addition, at the request of the user or based on the result of the first recognition and the result of the second recognition, the refrigerator 100 may purchase the food that is periodically put into and taken out from the refrigerator 100. Further, to this end, the refrigerator 100 may collect product information from a product information providing server (not shown) that provides product information, and display the collected product information on the display 161. To this end, the refrigerator 100 may communicate with the product information providing server through a network 400.

In addition, the refrigerator 100 may receive information on the user terminal 200, and register the user terminal 200. When the refrigerator receives, from the user terminal, a signal indicating that the user terminal 200 is located at a predetermined specific location (such as a mart or a market), or a signal indicating that the user terminal 200 is connected to a predetermined specific website (such as an online food shopping mall), the refrigerator 100 may transmit the storage status information about the food to the user terminal 200, to thereby allow the user to purchase food while checking the storage status information about the food displayed on the user terminal 200.

Further, the user terminal 200 may be provided with a service for monitoring, driving, or controlling the state information of the refrigerator 100 through an authentication process after accessing a refrigerator driving application or a refrigerator driving website. The user terminal 200 which has completed the authentication process in the present embodiment may drive the refrigerator 100 and control the operation of the refrigerator 100. In addition, the user terminal 200 may display the information displayed on the refrigerator 100 in the same manner. For example, the user terminal 200 may display information corresponding to a command input of the user (including a speaking person), a processing result corresponding to the command input the user, and an operation mode, an operation status, and an error status of the refrigerator 100, and the storage state of the food in the refrigerator 100. For example, when the user requests a storage status information request signal for the food of the refrigerator 100 by using the user terminal 200, the refrigerator 100 may generate storage status information for the food, and transmit the storage status information to the user terminal 200.

In this embodiment, the user terminal 200 may be a desktop computer, a smart phone, a notebook computer, a tablet PC, a smart TV, a mobile phone, a personal digital assistant (PDA), a laptop, a media player, a micro server, a global positioning system (GPS) device, an electronic book terminal, a digital broadcast terminal, a navigation system, a kiosk, an MP3 player, a digital camera, a home appliance, and any other mobile or non-mobile computing device, but the present disclosure is not limited to these examples. In addition, the user terminal 200 may be a wearable terminal having a communication function and a data processing function, such as a watch, a pair of glasses, a hair band, or a ring. The user terminal 200 is not limited to the above description, and any terminal capable of web browsing can be used without limitation.

The server 300 may be a database server that provides big data required for applying various artificial intelligence algorithms, and data used for operating the refrigerator 100. In addition, the server 300 may include a web server or an application server for remotely controlling the operation of the refrigerator 100 using a refrigerator driving application or a refrigerator driving web browser installed in the user terminal 200.

Here, artificial intelligence (AI) is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed More specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may be used to take an approach that builds models for deriving predictions and decisions from inputted data.

The server 300 may transmit and receive signals to and from the refrigerator 100. In particular, the server 300 may perform a first recognition of recognizing food that is put into the refrigerator 100 and transmit the result to the refrigerator, and perform a second recognition of recognizing food that is taken out from the refrigerator 100 and transmit the result to the refrigerator 100. The server 300 may cause the refrigerator 100 to display storage status information about the food in the refrigerator 100 based on the result of the first recognition and the result of the second recognition. The server 300 may cause the refrigerator 100 to update the storage status information about the food when the performance of at least one of the first recognition and the second recognition is completed.

In addition, at the request of the user or based on the result of the first recognition and the result of the second recognition, the server 300 may purchase the food that is periodically put into and taken out from the refrigerator 100. Further, to this end, the server 300 may collect product information from a product information providing server (not shown) that provides product information, and display the collected product information on the refrigerator 100 and/or the user terminal 200. To this end, the server 300 may communicate with the product information providing server through the network 400.

Further, the server 300 may register the user terminal 200, and when the server 300 receives, from the user terminal, a signal indicating that the user terminal 200 is located at a predetermined specific location (such as a mart or a market) or a signal indicating that the user terminal 200 is connected to a pre-designated specific website (such as an online food shopping mall), the server 300 may transmit the storage status information about the food to the user terminal 200, to thereby allow the user to purchase food while checking the storage status information about the food displayed on the user terminal 200.

The network 400 may perform a role of connecting the refrigerator 100, the user terminal 200, and the server 300. The network 400 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. The network 400 may also send and receive information using short distance communication and/or long distance communication. The short distance communication may include Bluetooth®, radio frequency identification (RFID), infrared data association (IrDA), ultra-wideband (UWB), ZigBee, and Wi-Fi (wireless fidelity) technologies, and the long distance communication may include code division multiple access (CDMA), frequency division multiple access (FDMA), time division multiple access (TDMA), orthogonal frequency division multiple access (OFDMA), and single carrier frequency division multiple access (SC-FDMA).

The network 400 may include connection of network elements such as hubs, bridges, routers, switches, and gateways. The network 400 may include one or more connected networks, including a public network such as the Internet and a private network such as a secure corporate private network. For example, the network may include a multi-network environment. Access to the network 400 may be provided via one or more wired or wireless access networks. Further, the network 400 may support 5G communication and/or an Internet of Things (IoT) network for exchanging and processing information between distributed components such as objects.

Figure 3:
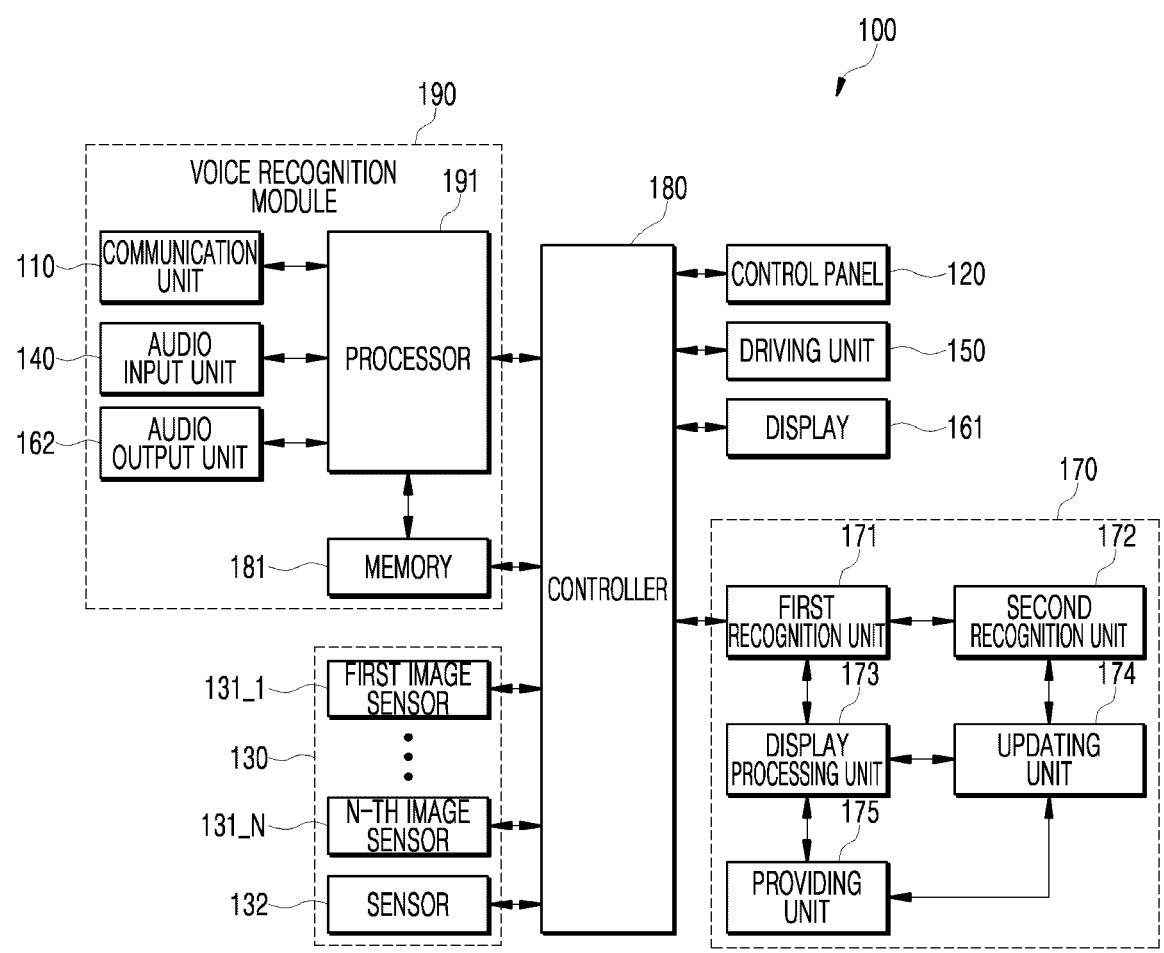
FIG. 3 is a schematic block diagram of a refrigerator according to an embodiment of the present disclosure.

FIG. 3 is a schematic block diagram of a refrigerator according to an embodiment of the present disclosure. In the following description, description of the parts that are the same as those in FIG. 1 and FIG. 2 will be omitted. Referring to FIG. 3, the refrigerator 100 may include a communication unit 110, a control panel 120, a sensor unit 130, an audio input unit 140, a driving unit 150, an output unit including a display 161 and an audio output unit 162, a processing unit 170, a controller 180, a memory 181, and a processor 191. In this embodiment, the communication unit 110, the audio input unit 140, the audio output unit 162, the memory 181, and the processor 191 may be included in a voice recognition module 190.

The communication unit 110 may provide a communication interface required to provide signals transmitted/received between the refrigerator 100, the user terminal 200, and/or the server 300 in the form of packet data in cooperation with the network 400. The communication unit 110 may support various kinds of object intelligence communications (such as Internet of things (IoT), Internet of everything (IoE), and Internet of small things (IoST)) and may support communications such as machine to machine (M2M) communication, vehicle to everything communication (V2X), and device to device (D2D) communication.

The control panel 120 may include a plurality of manipulation buttons (not shown), and may transmit a signal corresponding to an input button to the controller 180. The temperature of the refrigerator 100 and the selection of various functions may be set by the manipulation of the control panel 120. The control panel 120 may be composed of a sensor, a button, or a switch structure capable of recognizing a user's touch or pressing operation. In this embodiment, the control panel 120 may transmit a manipulation signal manipulated by the user to the controller 180 in order to search for food in the refrigerator (included in storage status information displayed on the display 161 or the user terminal 200), in order to sort food, in order to move the storage location of food, in order to modify the details of food, and in order to purchase food.

The sensor unit 130 may include a first image sensor 131_1 to an N-th image sensor 131_N for sensing the internal situation and the external situation of the refrigerator 100, and a plurality of other sensors 132. The first image sensor 131_1 to the N-th image sensor 131_N may refer to a camera for photographing a subject in a photographing area using a complementary metal-oxide semiconductor (COMS) module (not shown) or a charge coupled device (CCD) module. An input image frame may be provided as a COMS module or a CCD module via a lens (not shown), and the COMS module or the CCD module can convert an optical signal of a subject that has passed through the lens into an electrical signal, and output the electrical signal. In addition, the camera may be a PTZ camera having a pan/tilt/zoom function. An image signal processing unit (not shown) is provided inside the camera, and the image signal processing unit may reduce noise for a photographed image frame and may perform image signal processing operations for image quality improvement, such as gamma correction, color filter array interpolation, color matrix, color correction, and color enhancement. Further, the image signal processing unit may perform functions such as a coloring process, a blurring process, an edge emphasizing process, an image analysis process, an image recognition, and an image effect process. Facial recognition, scene recognition, and the like may be performed for the image recognition. For example, brightness level adjustment, color correction, contrast adjustment, contour enhancement adjustment, screen division processing, character image generation, and image synthesis processing may be performed.

In the present embodiment, the first image sensor 131_1 may be provided on the front surface of the refrigerator 100, that is, above the display 161, so as to photograph the periphery of the refrigerator 100. For example, the first image sensor 131_1 may photograph a user holding food. In addition, the second image sensor 131_2 to the N-th image sensor 131_N may be provided inside the refrigerator 100 so as to photograph the inside of the refrigerator 100. For example, the second image sensor 131_2 to the N-th image sensor 131_N may be provided on a side wall of each of a plurality of separated refrigerating rooms or freezer rooms of the refrigerating compartment. The second image sensor 131_2 may be provided on the side wall of the uppermost refrigerating room inside the first door. The second image sensor 131_2 to the N-th image sensor 131_N may be provided at any position from which the inside of the refrigerator 100 can be photographed. The processing unit 170 or the controller 180 receiving the image captured by the second image sensor 131_2 to the N-th image sensor 131_N may generate storage location information of food. Meanwhile, the images captured by the first image sensor 131_1 to the N-th image sensor 131_N may be stored in the memory 181.

The sensor 132 may sense at least one among information in the refrigerator 100, surrounding environment information surrounding the refrigerator 100, and user information. For example, the sensor 132 may include at least one among an obstacle sensor (for example, a proximity sensor or a LIDAR sensor), a weight sensor, an illumination sensor, a touch sensor, an acceleration sensor, a magnetic sensor, a G-sensor, a gyroscope sensor, a motion sensor, an RGB sensor, an infrared sensor, a finger scan sensor, an ultrasonic sensor, an optical sensor, a battery gauge, an environmental sensor (for example, a barometer, a hygrometer, a thermometer, a radiation detection sensor, a heat detection sensor, or a gas detection sensor) and a chemical sensors (for example, an electronic nose, a healthcare sensor, and a biometric sensor). Meanwhile, in the present embodiment, the refrigerator 100 can combine information sensed by at least two sensors 132 among the sensors 132, and utilize the combined information. In addition, a signal sensed by the sensor 132 may be stored in the memory 181.

The audio input unit 140 may receive a spoken utterance (such as a voice command) uttered by the user. To this end, the audio input unit 140 may include one or more microphones (not shown). In addition, a plurality of microphones (not shown) may be provided to more accurately receive the voice of the user. Here, each of the plurality of microphones may be disposed at different positions, and the received spoken utterance of the user may be processed as an electrical signal.

The driving unit 150 may perform an operation implemented in the refrigerator 100 under the control of the controller 180. The driving unit 150 may include a compressor driving unit (not shown), a refrigerating compartment fan driving unit (not shown), and a freezer compartment fan driving unit. The compressor driving unit may supply operating power to operate the compressor according to the control command of the controller 180, and may control the operation of the compressor. At this time, the compressor driving unit may include an inverter (not shown) and an inverter driving unit (not shown) for controlling the compressor. The refrigerating compartment fan driving unit may control the rotation operation and the rotation speed of the refrigerating compartment fan so that the cool air that has been heat-exchanged with the refrigerating compartment is supplied in response to the control command of the controller 180. The freezer compartment fan driving unit may control the rotation operation and the rotation speed of the freezer compartment fan so that the cool air that has been heat-exchanged with the freezer compartment is supplied in response to the control command of the controller 180. Here, the compressor may compress the refrigerant to circulate the refrigerant, and adjust the refrigerant to control the temperature of the discharged cool air. In addition, the refrigerating compartment fan and the freezer compartment fan may be configured to allow the cool air heat-exchanged with the refrigerant by the heat exchanger to be discharged to the refrigerating compartment and the freezer compartment, respectively.

The output unit may include a display 161 and an audio output unit 162. The display 161 may display, for example, information corresponding to a command input by a user (including a speaking person), a processing result corresponding to a command input of the user, an operation mode, an operation status, and an error status of the refrigerator 100, and the storage state of the food in the refrigerator 100. The display 161 may be configured as a touch screen by forming a mutual layer with a touch pad. In this case, the display 161 may be used as an input unit capable of inputting information by the user's touch in addition to the output unit. To this end, the display 161 may be configured as a touch recognition display controller or various other input/output controllers. As an example, the touch recognition display controller may provide an output interface and an input interface between a device and a user. The touch recognition display controller may transmit and receive electrical signals to and from the controller 180. Additionally, the touch recognition display controller may display a visual output to the user, and the visual output may include output of text, graphics, images, video, and combinations thereof. The display 161 may be a display member such as an organic light emitting display (OLED), a liquid crystal display (LCD), or a light emitting display (LED) capable of touch recognition.

The audio output unit 162 may output, as audio, a notification message such as a warning sound, an operation mode, an operation status, or an error status, information corresponding to a command input of the user, a processing result corresponding to a command input by the user. The audio output unit 162 may convert an electrical signal from the controller 180 into an audio signal, and output the audio signal. For this purpose, a speaker or the like may be provided.

The processing unit 170 may perform a first recognition of recognizing the food that is put into the refrigerator 100, perform a second recognition of recognizing the food that is taken out from the refrigerator 100, and display storage status information on the food inside the refrigerator based on the result of the first recognition and the result of the recognition. The processing unit 170 may also allow the refrigerator 100 to purchase the food that is periodically put into and taken out from the refrigerator 100, based on a request of the user or based on the result of the first recognition and the result the second recognition. In this embodiment, the processing unit 170 may perform learning in conjunction with the controller 180, or may receive a learning result from the controller 180. To this end, the processing unit 170 may include a first recognition unit 171, a second recognition unit 172, a display processing unit 173, an updating unit 174, and a providing unit 175.

The first recognition unit 171 may perform a first recognition of the food that is put into the refrigerator 100. In this embodiment, the first recognition result about the food recognized by the first recognition unit 171 may include type information of the food, management information of the food (for example, the storage status information), and storage location information of the food.

The first recognition unit 171 may sense the opening of any one of the first door 101 to the fourth door 104 of the refrigerator 100. Here, the first recognition unit 171 may sense the above-described adhesion force and magnetic force of the gasket and the elastic force of the spring, and when a force greater than the adhesion force and the magnetic force of the gasket and the elastic force of the spring has been generated, the first recognition unit 171 may sense the opening of one of the first door 101 to the fourth door 104. Further, as described above, the first recognition unit 171 may also sense the opening of any one of the first door 101 to the fourth door 104 from the operation of the door opening/closing module in response to a simple touch or a voice command of the user.

The first recognition unit 171 may sense the opening of any one of the first door 101 to the fourth door 104, and activate the image recognition function and the voice recognition function. Here, the activation of the image recognition function may include a state of sensing the opening of a door, and then allowing one or more of the second image sensor 131_2 to the N-th image sensor 131_N to start operation in response to the control of the first recognition unit 171. In addition, the activation of the voice recognition function may include a state of allowing the voice recognition module 190 to start operation, and the start of the operation may be determined by whether the user has uttered a wakeup word. In this embodiment, the voice recognition function may be activated when the user utters a predetermined wakeup word (for example, "Hi, LG") before or after opening a door of the refrigerator 100. Alternatively, when the user opens a door of the refrigerator 100, the voice recognition function may be activated even if the user does not utter the wakeup word. Alternatively, when the user looks at the refrigerator 100 for a predetermined time (for example, 3 seconds), the voice recognition function may be activated even if the user does not utter the wakeup word. Here, the first image sensor 131_1, which has captured the user's image, may determine whether to activate the voice recognition function by checking how long the user has been looking at the refrigerator 100 through the image signal processing unit included in the first image sensor 131_1.

After the image recognition function has been activated, the first recognition unit 171 may acquire at least one image of the food that is put into the refrigerator 100. Here, the captured image of the food may include at least one image captured by at least one among the first image sensor 131_1 to the N-th image sensor 131_N. The first recognition unit 171 may estimate the type of food represented by the photographed image of the food by using a first deep neural network that has been trained to determine the type of food through an acquired image. Here, the first deep neural network, which has been trained to determine the type of food through at least one image, may be received from the server 300.

The first recognition unit 171 may output a spoken utterance inducement signal when the estimation of the type of food through the image recognition function fails. The first spoken utterance of the user, which has been received in response to the output of the spoken utterance inducement signal, may be transmitted to the voice recognition module 190 through the first recognition unit 171. Herein, the first spoken utterance may include a voice indicating that food is being put into the refrigerator 100 (for example, "Store these apples"). The first recognition unit 171 and the voice recognition module 190 may transmit and receive voice recognition related signals to and from each other. When the voice recognition function has been activated, the first recognition unit 171 may recognize the type of food represented by the first spoken utterance signal by using a second deep neural network which has been trained to determine the type of food through voice. Here, the second deep neural network, which has been trained to determine the type of food through voice, may be received from the server 300.

The first recognition unit 171 may sense the closing of the door after estimating the type of food using the image recognition function, or after recognizing the type of food using the voice recognition function. The first recognition unit 171 may sense the closing of the door when the adhesion force and magnetic force of the gasket and the elastic force of the spring is zero, and may recognize the closing of the door from the operation of the door opening/closing module in response to the user's simple touch or voice command. The first recognition unit 171 may sense the closing of the door, and then output information indicating that the storage of food in the refrigerator 100 has been completed. Here, the first recognition unit 171 may cause the display 161 and/or the audio output unit 162 to output information indicating that the storage of the food in the refrigerator 100 has been completed.

In an alternative embodiment, the first recognition unit 171 may sense the opening of one or more of the first door 101 to the fourth door 104 of the refrigerator 100, and may acquire at least one image of the food after the door is opened. Here, the captured image of the food may include at least one image captured by at least one among the first image sensor 131_1 to the N-th image sensor 131_N.

The first recognition unit 171 may recognize the type of the food by using the first deep neural network described above, or may recognize the type of the food by comparing the captured image of the food with reference type images of the food stored in the memory 181. Further, the management information (such as storage information) of the food may be recognized through comparison between the previously captured image (history image) stored in the memory 181 and the presently captured image. In other words, when the previously captured image is different from the presently captured image, it may be recognized that the food has been put into the refrigerator 100. For example, when there are no apples in the previously captured image but apples are present in the presently captured image, it may be recognized that the apples have been put into. For example, if there is 1 apple in the previously captured image but 3 apples are present in the presently captured image, it can be recognized that apples have additionally been put into the refrigerator 100. Herein, when the first recognition unit 171 fails to recognize the captured image of food, the first recognition unit 171 may cause the display 161 and/or the audio output unit 162 to output information indicating that the captured image of the food has not been recognized. In this case, the first recognition unit 171 may request a spoken utterance from the user indicating storage of the food, and may recognize the storage of the food by receiving the spoken utterance indicating the storage of the food from the user. The first recognition unit 171 may sense the closing of the door after completing the recognition of the captured image of the food, and output information indicating that the storage of the food in the refrigerator 100 has been completed.

In an alternative embodiment, the first recognition unit 171 may sense the opening of one or more of the first door 101 to the fourth door 104 of the refrigerator 100. After the door is opened, the first recognition unit 171 may cause the display 161 and/or the audio output unit 162 to output activation status information on the voice recognition function. Herein, the activation status information on the voice recognition function may generally be determined by whether the wakeup word has been received. In the present embodiment, when the user opens a door of the refrigerator 100, the status of the voice recognition module 190 may be changed to the voice recognition function activation status even if the user does not speak the wakeup word. The first recognition unit 171 may output the voice recognition function activation status information, and then receive the first spoken utterance of the user indicating the storage of food. The recognition of the first spoken utterance of the first recognition unit 171 is the same as that described above, and thus description thereof will be omitted. Thereafter, the first recognition unit 171 may sense the closing of the door, and then output information indicating that the storage of food in the refrigerator 100 has been completed.

In an alternative embodiment, the first recognition unit 171 may sense the opening of two or more of the first door 101 to the fourth door 104 of the refrigerator 100. When the first recognition unit 171 detects the opening of two or more doors, the first recognition unit 171 may cause the display 161 and/or the audio output unit 162 to encourage the user to open only one door. The user, who realizes that the two or more doors have been opened, may close other doors except for one door. The first recognition unit 171 may determine information on the location of food that is put into the refrigerator 100 according to the location of the door that was last closed, and output information indicating that the storage of food in the refrigerator 100 has been completed.

The second recognition unit 172 may perform a second recognition of recognizing the food that is taken out from the refrigerator 100. In this embodiment, the second recognition result about the food recognized by the second recognition unit 172 may include type information of the food, management information of the food (for example, whether food has been taken out from the refrigerator 100), and information on from where food has been taken out.

The second recognition unit 172 may sense the opening of one or more of the first door 101 to the fourth door 104 of the refrigerator 100. After the door is opened, the second recognition unit 172 may receive a second spoken utterance of the user indicating that the food is being taken out from the refrigerator 100. Herein, the second spoken utterance may include a spoken utterance indicating that food is being taken out from the refrigerator 100 (for example, "Take out apples"). The voice recognition module 190 receiving the second spoken utterance of the user may transmit and receive signals related to voice recognition to and from the second recognition unit 172. The voice recognition module 190 may recognize the type and management information of food for the second spoken utterance of the user by comparing the second spoken utterance of the user with reference types of food (for example, machine language and/or an image corresponding to a text) and management information of food (for example, machine language corresponding to the food taken out from the refrigerator 100), stored in the memory 181. The second recognition unit 172 may sense the closing of the door after receiving the recognition result of the second spoken utterance of the user from the voice recognition module 190. The second recognition unit 172 may sense the closing of the door, and then output information indicating that the food has been completely taken out from the refrigerator 100.

In an alternative embodiment, the second recognition unit 172 may sense the opening of one or more of the first door 101 to the fourth door 104 of the refrigerator 100, and may acquire a first image which is generated by photographing the inside of the refrigerator 100 when the door is opened. Here, the first image may include at least one image captured by at least one among the second image sensor 131_2 to the N-th image sensor 131_N when the door is opened. The second recognition unit 172 may sense the closing of the opened door, and acquire a second image which is generated after photographing the inside of the refrigerator 100 after the door is closed. Here, the second image may include at least one image captured by at least one among the second image sensor 131_2 to the N-th image sensor 131_N when the door is closed.

The second recognition unit 172 may recognize the type of food by comparing the first image or the second image with the reference type images of the food stored in the memory 181. Further, the second recognition unit 172 may compare the first image with the second image and thereby check the difference between the images, and determine the food taken out from the refrigerator 100 based on the identified difference. That is, if the first image is different from the second image, it may be determined that food has been taken out from the refrigerator 100. For example, when there is an apple in the first image but there is no apple in the second image, it may be determined that the apple has been taken out from the refrigerator 100. Further, when there are three apples in the first image but there is one apple in the second image, it may be determined that apples have been taken out from the refrigerator 100. Herein, when the second recognition unit 172 fails to recognize the captured image of food, the second recognition unit 172 may cause the display 161 and/or the audio output unit 162 to output information indicating that the captured image of the food has not been recognized. In this case, the second recognition unit 172 may request a second spoken utterance from the user indicating that the food is being taken out from the refrigerator 100, and may recognize that the food is being taken out by receiving, from the user, the second spoken utterance indicating that the food is being taken out. The second recognition unit 172 may sense the closing of the door after completing the recognition of the captured image of the food, and output information indicating that the food has completely been taken out from the refrigerator 100.

In an alternative embodiment, the second recognition unit 172 may sense the opening of one or more of the first door 101 to the fourth door 104 of the refrigerator 100. After the door is opened, the second recognition unit 172 may cause the display 161 and/or the audio output unit 162 to output activation status information on the voice recognition function. Herein, the activation status information on the voice recognition function may generally be determined by whether the wakeup word has been received. In the present embodiment, when the user opens a door of the refrigerator 100, the status of the voice recognition module 190 may be changed to the voice recognition function activation status even if the user does not speak the wakeup word. The second recognition unit 172 may output the voice recognition function activation status information, and then receive the second spoken utterance of the user indicating that the food is being taken out from the refrigerator 100. The recognition of the second spoken utterance of the second recognition unit 172 is the same as that described above, and thus description thereof will be omitted. Thereafter, the second recognition unit 172 may sense the closing of the door, and then output information indicating that the food has completely been taken out from the refrigerator 100.

The display processing unit 173 may display the storage status information about the food in the refrigerator 100 on the display 161 and/or the user terminal 200 based on the first recognition result of the first recognition unit 171 and the second recognition result of the second recognition unit 172.

The display processing unit 173 may display the storage status information for the food in the refrigerator 100 on the display 161 and/or the user terminal 200 at the request of the user or periodically. Here, the storage status information on the food may include a storage location of the food (refrigerating compartment or freezer compartment), a list of foods (text indicating types of food and food images), and an elapsed number of days since the food was initially stored.

Furthermore, the display processing unit 173 may display, on the display 161 and/or the user terminal 200, display information which is generated using the refrigerator 100, such as information on an editing status of the storage status information of food in the refrigerator 100 (for example, deleting, selecting, modifying, moving, or sorting the food in ascending order or descending order), and information on the purchasing status of the food (for example, adding food to the shopping cart list, deleting food from the shopping cart list, and ordering food).

The updating unit 174 may update the storage status information about the food when at least one of the first recognition of the first recognition unit 171 and the second recognition of the second recognition unit 172 is completed. Through the update of the updating unit 174, the user may recognize the latest storage status information about the food whenever he or she requests it, and may conveniently manage the food.

The providing unit 175 may access the product information providing server in response to the user's selection and provide the product information to be displayed on the display 161 and/or the user terminal 200, and may provide information related to purchase and delivery of the food selected by the user. In an alternative embodiment, the providing unit 175 may provide purchase recommendation information for the food that is periodically put into and/or taken out from the refrigerator 100, through the result of analysis on the result of the first recognition and the result of the second recognition using a deep neural network, or at the user's request, and may purchase food corresponding to the user's purchase request information.

In addition, when a selection is made for one or more foods displayed on the display 161 and/or user terminal 200, the providing unit 175 may provide a recipe for a dish that can be made using the selected foods, provide information on cooking equipment available in the home according to the recipe, and further provide information for preheating the cooking equipment so that the refrigerator 100 may preheat the cooking equipment (for example, an electric oven (500 in FIG. 7) or a microwave oven (600 in FIG. 7)) via the network 400. The providing unit 175 may provide health and beauty information, music, news, and traffic information to the display 161 and/or the user terminal 200.

In addition, the providing unit 175 may provide predetermined information for providing a messenger notification, playing a YouTube video, or playing music that the user enjoys, and may provide weather information from a weather server (not shown) in response to an utterance of the user such as "How's the weather today?".

In the present embodiment, the processing unit 170 may be provided outside the controller 180, or may be provided inside the controller 180 to operate like the controller 180 as shown in FIG. 3, or may be provided inside the server 300 of FIG. 1.

The controller 180 may control the entire operation of the refrigerator 100 by driving control software installed in the memory 181 as a kind of central processing unit. The controller 180 may control the display 161 and/or the audio output unit 162 to provide various functions such as outputting storage status information about the food in the refrigerator 100 and outputting a list of purchase information for purchasing the food.

Here, the controller 180 may include all kinds of devices capable of processing data like a processor. Herein, the term "processor" may refer to a data processing device embedded in hardware, for example, including physically structured circuits in order to perform functions represented as a code or command contained in a program. Examples of the data processing device built in hardware may include, but are not limited to, processing devices such as a microprocessor, a central processing unit (CPU), a processor core, a multiprocessor, an application-specific integrated circuit (ASIC), a field programmable gate array (FPGA), and the like.

In this embodiment, the controller 180 may perform a first recognition of recognizing food put into the refrigerator 100, and display storage status information about food in the refrigerator 100 including food recognized in the first recognition, and may perform machine learning, such as a deep learning, in order to perform a second recognition of recognizing at least one food product taken out from the refrigerator 100. The memory may store data such as data used for the machine learning and result data.

Deep learning learning, which is a subfield of machine learning, enables data-based learning through multiple layers. As the number of layers in deep learning increases, the deep learning network may acquire a collection of machine learning algorithms that extract core data from multiple datasets.

Deep learning structures may include an artificial neural network (ANN), and may include a convolutional neural network (CNN), a recurrent neural network (RNN), a deep belief network (DBN), and the like. The deep learning structure according to the present embodiment may use various structures well known in the art. For example, the deep learning structure according to the present disclosure may include a CNN, an RNN, a DBN, and the like. RNN is an artificial neural network structure which is formed by building up layers at each instance, and which is heavily used in natural language processing and the like and effective for processing time-series data which vary over a course of time. A DBN includes a deep learning structure formed by stacking up multiple layers of a deep learning scheme, restricted Boltzmann machines (RBM). A DBN has the number of layers formed by repeating RBM training. A CNN includes a model mimicking a human brain function, built under the assumption that when a person recognizes an object, the brain extracts the most basic features of the object and recognizes the object based on the results of complex processing in the brain.

Further, the artificial neural network can be trained by adjusting connection weights between nodes (if necessary, adjusting bias values as well) so as to produce desired output from given input. Also, the artificial neural network can continuously update the weight values through learning. Furthermore, methods such as back propagation may be used in training the artificial neural network.

The controller 180 may be equipped with an artificial neural network, and may perform machine learning-based user recognition and user tone color recognition using input audio input signals as input data.

The controller 180 may include an artificial neural network, for example, a deep neural network (DNN) and train the DNN, and examples of the DNN include CNN, RNN, DBN, and so forth. As a machine learning method for such an artificial neural network, both unsupervised learning and supervised learning may be used. The control unit 190 may perform control to have a tone artificial neural network structure to be updated after learning.

The memory 181 records various kinds of information necessary for the operation of the refrigerator 100 and may include a volatile or nonvolatile recording medium. Here, the memory 181 may include magnetic storage media or flash storage media, but the scope of the present disclosure is not limited thereto. The memory 170 may include an internal memory and/or an external memory and may include a volatile memory such as a DRAM, a SRAM or a SDRAM, and a non-volatile memory such as one time programmable ROM (OTPROM), a PROM, an EPROM, an EEPROM, a mask ROM, a flash ROM, a NAND flash memory or a NOR flash memory, a flash drive such as an SSD, a compact flash (CF) card, an SD card, a Micro-SD card, a Mini-SD card, an XD card or memory stick, or a storage device such as a HDD.

In this embodiment, the communication unit 110, the audio input unit 140, the audio output unit 162, the memory 181, and the processor 191 may be included in the voice recognition module 190.

In this embodiment, the voice recognition module 190 may include a communication unit 110 for transmitting a driving signal and/or various information corresponding to a voice command to the user terminal 200 and/or the server 300, an audio input unit 140 for receiving a voice command, an audio output unit 162 for outputting predetermined information as sounds, and a processor 191 for analyzing a voice command using a voice recognition algorithm to generate a driving signal of the refrigerator 100.

FIG. 4 illustrates displaying of storage status information about the food in the refrigerator 100 on the display 161 and/or the user terminal 200 by the processing unit 170 according to an embodiment of the present disclosure. Referring to FIG. 4, (a) shows storage status information on food in the refrigerating compartment, and (b) shows storage status information on food in the freezer compartment. Referring to (a) and (b) of FIG. 4, a storage location of the food (refrigerating compartment or freezer compartment), a list of foods (text indicating types of food and food images), and an elapsed number of days since the food was initially stored may be displayed.

Referring to FIG. 4, when the user selects a first identifier 401, log-in or log-out processing, food deletion history information, and shopping cart information may be displayed. When the user selects a second identifier 402 and enters a search word corresponding to a desired food, the search result of the food may be displayed. When the user selects a third identifier 403, food that is put into the refrigerator 100 may be added. When the user selects a fourth identifier 404, a list of the food in the refrigerator compartment or the freezer compartment may be sorted in descending order or ascending order and displayed. When the user selects a fifth identifier 405, an elapsed number of days of storage of the food may be sorted in descending order or ascending order and displayed. When the user selects a sixth identifier 406, an editing window for editing the information of the selected food appears, and editing such as deletion, selection, modification, movement of the food in the editing window may be performed. Further, by selecting a food storage position (refrigerating compartment, left refrigerating compartment, right refrigerating compartment, freezer compartment, left freezer compartment, or right freezer compartment), the food list corresponding to the selected position can be displayed.

FIG. 5 illustrates displaying of storage status information about the food in the refrigerator 100 on the display 161 and/or the user terminal 200 by the processing unit 170 according to another embodiment of the present disclosure. Referring to FIG. 5, (a) shows storage status information about the food in the refrigerator 100, and (b) shows a state in which the editing window has appeared in response to selection of the sixth identifier 406.

Referring (a) of FIG. 5, at least one selected food may be displayed differently (for example, highlighted) from the other foods, and the selected food may be deleted by selection of a seventh identifier 407, or may be moved to the shopping cart for purchase by selecting an eighth identifier 408.

In the editing window of (b) of FIG. 5, the user may write an input date, a warning date, a storage location, and other information in a memo field, and the edited content may be stored in the memory 181 by selecting a ninth identifier 409. Here, the input date is the same as the food storage start date, the warning date is the same as the shelf life of the food, and when there is no particular input, a default date may be entered using the result of the first recognition.

FIG. 6 illustrates displaying of storage status information about the food in the refrigerator 100 on the display 161 and/or the user terminal 200 by the processing unit 170 according to another embodiment of the present disclosure. Referring to FIG. 6, (a) shows food information stored in the shopping cart, and (b) shows the editing status of the shopping cart.

The selected food and the date stored in the shopping cart may be displayed in the shopping cart. When a key word corresponding to a desired food is typed after selecting a tenth identifier 410, the food corresponding to the key word in the shopping cart may be displayed as a search result. A food product to be added to the shopping cart may be added by the selection of an eleventh identifier 411. Referring to (b) of FIG. 6, the selection status of the food may be displayed by selecting a twelfth identifier 412, the selected foods may be deleted from the shopping card by the selection of a thirteenth identifier 413, and the selected foods may be ordered by the selection of a fourteenth identifier 414. In this embodiment, when the fourteenth identifier 414 is selected, the order information may be transmitted to an affiliated shopping mall, and when payment is completed using a predetermined payment method, the ordered food may be delivered to a predetermined address.

Figure 7:
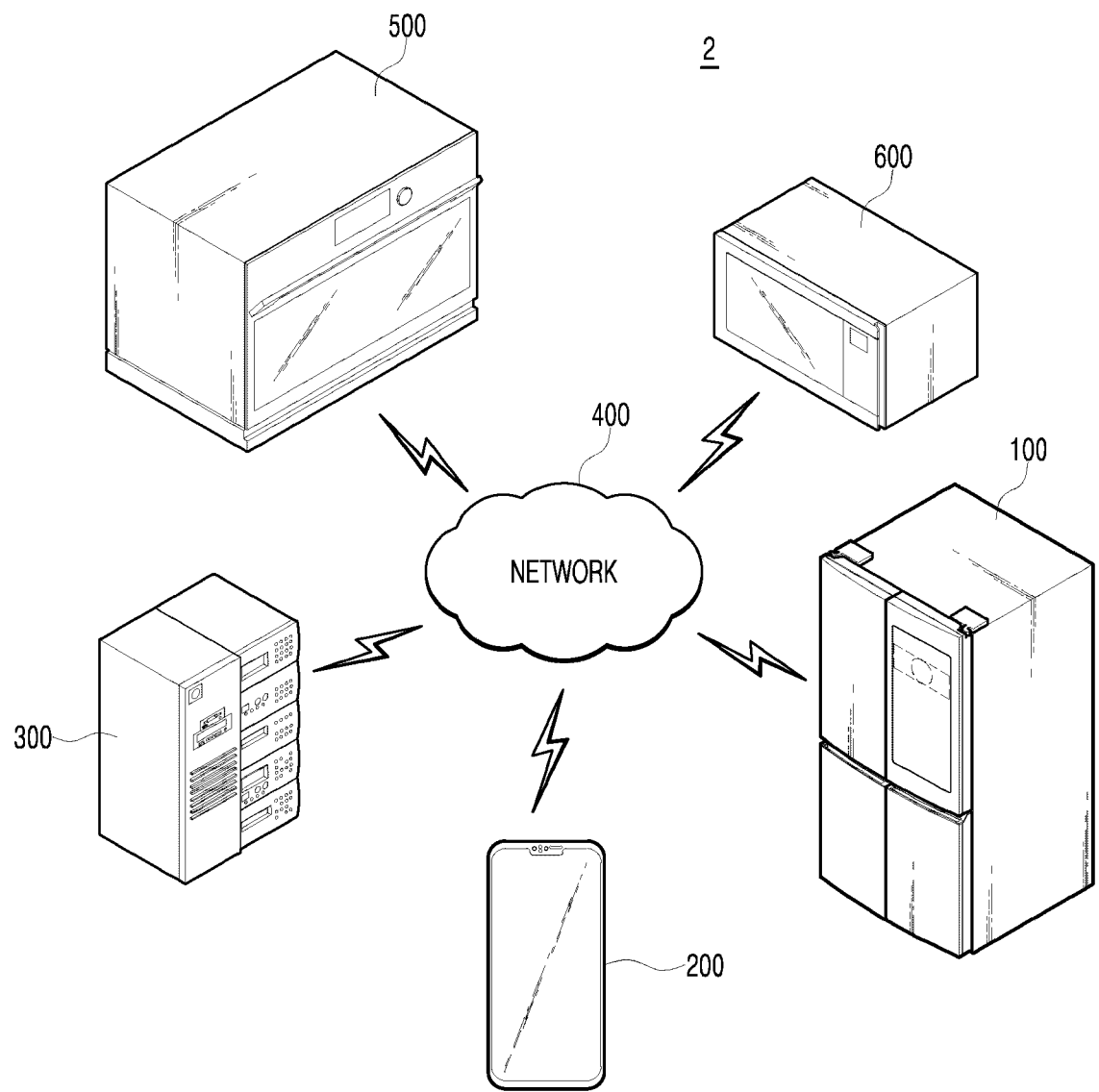
FIG. 7 illustrates a refrigerator control environment including a refrigerator, a user terminal, a server, an electronic cooking appliance, and a network connecting them according to another embodiment of the present disclosure.

FIG. 7 illustrates a refrigerator control environment including a refrigerator, a user terminal, a server, an electronic cooking appliance, and a network connecting them according to another embodiment of the present disclosure. In the following description, description of the parts that are the same as those in FIG. 1 to FIG. 6 will be omitted. Referring to FIG. 7, a refrigerator control environment 2 may include a refrigerator 100, a user terminal 200, a server 300, a network 400, an electric oven 500, and a microwave oven 600.

The refrigerator 100 may perform a first recognition of recognizing at least one food that is put into the refrigerator 100, perform a second recognition of recognizing at least one food to be taken out from the refrigerator 100, and display storage status information on the food inside the refrigerator after analyzing the result of the first recognition and the result of the second recognition using a deep neural network. The refrigerator 100 may update the storage status information about the food when the performance of at least one of the first recognition and the second recognition is completed.

The refrigerator 100 may control the operation of the electric oven 500 and/or the microwave oven 600 interworking with the refrigerator 100 according to the storage status information on the food. Here, the interworking of the electric oven 500 and/or the microwave oven 600 with the refrigerator 100 indicates that these components may communicate with each other using the same network, and since the refrigerator 100 has a control code for the electric oven 500 and/or the microwave oven 600, the refrigerator 100 may control the operation of the electric oven 500 and the microwave oven 600. When a selection is made of one or more foods included in the storage status information for the food, the refrigerator 100 may provide a recipe for a dish that can be made using the selected foods, and the electric oven 500 and/or the microwave oven 600 may be preheated according to the recipe.

The user terminal 200 may be provided with a service for monitoring, driving, or controlling the state information of the refrigerator 100 through an authentication process after accessing a refrigerator driving application or a refrigerator driving website. The user terminal 200 which has completed the authentication process may control the operation of the refrigerator 100, and may further control the operation of the electric oven 500 and/or the microwave oven 600 interworking with the refrigerator 100.

The server 300 may transmit and receive signals to and from the refrigerator 100. When the server 300 receives, from the refrigerator 100, a selection of one or more foods included in the storage status information on the food, the server 300 may provide a recipe for a dish that can be made using the selected foods, and may generate information that can preheat the electric oven 500 and/or the microwave oven 600 according to the recipe to thereby be transmitted to the refrigerator 100 or directly to the electric oven 500 and/or the microwave oven 600.

Figure 8:
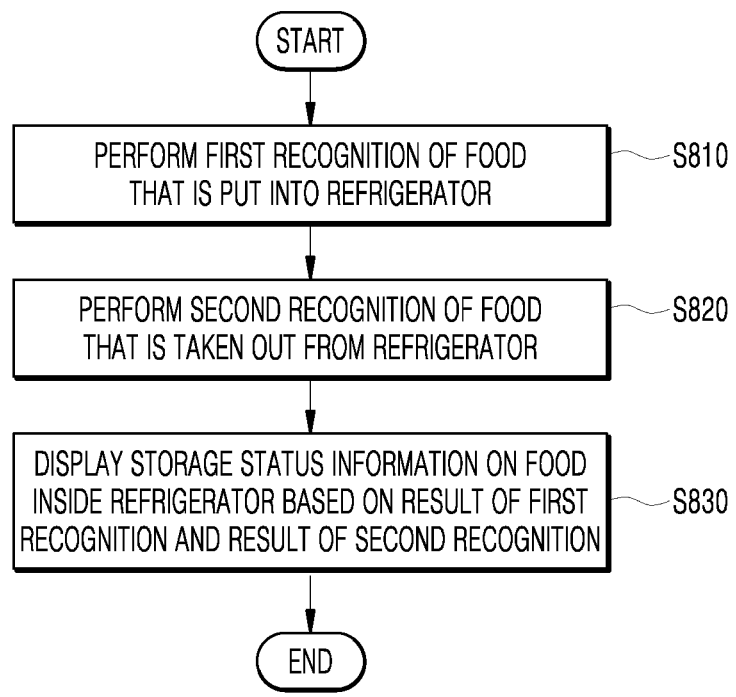
FIG. 8 is a flowchart illustrating an operation method of a refrigerator according to an embodiment of the present disclosure.

FIG. 8 is a flowchart illustrating an operation method of a refrigerator according to an embodiment of the present disclosure. In the following description, description of the parts that are the same as those in FIG. 1 to FIG. 7 will be omitted.

Referring to FIG. 8, in step S810, the refrigerator 100 performs a first recognition of recognizing food which is put into the refrigerator 100.

In order to perform the first recognition, the refrigerator 100 may perform operations of sensing of the opening of a door of the refrigerator 100 and activating an image recognition function and a voice recognition function, acquiring at least one photographed image of food which is put into the refrigerator 100, estimating the type of food represented by the photographed image of the food by using a first deep neural network that has been trained to determine the type of food through acquired images, outputting a spoken utterance inducement signal when estimation of the type of the food fails, receiving a first spoken utterance signal relating to the type of the food corresponding to the spoken utterance inducement signal, recognizing the type of the food represented by the first spoken utterance signal using a second deep neural network that has been trained to determine the type of food through voice, sensing the closing of the door of the refrigerator 100, and outputting information indicating that the recognized type of the food has been stored in the refrigerator 100. In addition, for the first recognition, the refrigerator 100 may perform operations of sensing the opening of the door of the refrigerator 100, acquiring the photographed image of food, sensing the closing of the door of the refrigerator 100, and an operation of outputting information indicating that the food is being stored in the refrigerator 100. In addition, for the first recognition, the refrigerator 100 may perform operations of sensing the opening of the door of the refrigerator 100, outputting the voice recognition function activation status information, receiving the first spoken utterance of a user indicating the storage of food, sensing the closing of the door of the refrigerator 100, and outputting information indicating that the food has been stored in the refrigerator 100. Further, for the first recognition, the refrigerator 100 may perform operations of sensing the opening of the door of the refrigerator 100, encouraging the user to open only one door when a plurality of doors are opened, recognizing food which is put into the refrigerator 100, sensing that all doors of the refrigerator 100 have been closed, determining information on the location where food has been stored depending of the location of the door that was last closed, and outputting information indicating that the food has been stored in the refrigerator 100.

In step S820, the refrigerator 100 performs a second recognition for food which is taken out from the refrigerator 100.

In addition, for the second recognition, the refrigerator 100 may perform operations of sensing the opening of the door of the refrigerator 100, receiving a second spoken utterance of the user indicating that the food is being taken out from the refrigerator 100, sensing the closing of the door of the refrigerator 100, and outputting information indicating that the food has been taken out from the refrigerator 100. Further, for the second recognition, the refrigerator 100 may perform operations of sensing the opening of the door of the refrigerator 100, acquiring a first image generated by photographing the inside of the refrigerator 100 when the door of the refrigerator 100 is opened, sensing the closing of the door of the refrigerator 100, acquiring a second image generated by photographing the inside of the refrigerator 100 after the door of the refrigerator 100 is closed, comparing the first image with the second image, determining food which has been taken out from the refrigerator 100 based on the difference which is found through the comparison, and outputting information indicating that food has been taken out from the refrigerator 100. In addition, for the second recognition, the refrigerator 100 may perform operations of sensing the opening of the door of the refrigerator 100, outputting voice recognition function activation status information, receiving a second spoken utterance of the user indicating that food is being taken out from the refrigerator 100, sensing the closing of the door of the refrigerator 100, and an outputting information indicating that the food has been taken out from the refrigerator 100.

In step S830, the refrigerator 100 displays the storage status information about the food in the refrigerator 100 based on the result of the first recognition and the result of the second recognition.

The refrigerator 100 may display the storage status information for the food in the refrigerator 100 on the display 161 and/or the user terminal 200 at the request of the user or periodically. Here, the storage status information on the food may include a storage location of food (refrigerating compartment or freezer compartment), a list of foods (text indicating types of food and food images), and an elapsed number of days since the food was initially stored. Furthermore, the refrigerator 100 may display, on the display 161 and/or the user terminal 200, display information which is generated using the refrigerator 100, such information on an editing status of storage status information of food in the refrigerator 100 (for example, deleting, selecting, modifying, moving, sorting in ascending order or descending order), and information on the purchasing status of the food (for example, adding food to the shopping cart list, deleting food from the shopping cart list, and ordering food).

In an alternative embodiment, the refrigerator 100 may update the storage status information about the food when the performance of at least one of the first recognition and the second recognition is completed.

In an alternative embodiment, the refrigerator 100 may access the product information providing server in response to the user's selection and provide the product information to be displayed on the display 161 and/or the user terminal 200, and may provide information related to purchase and delivery of the food selected by the user.

In an alternative embodiment, the refrigerator 100 may provide purchase recommendation information for the food that is periodically put into or taken out from the refrigerator 100 at the request of the user, and may purchase the food corresponding to the user's purchase request information.

In an alternative embodiment, the refrigerator 100 may receive information on the user terminal 200, and register the user terminal 200. When the refrigerator receives, from the user terminal, a signal indicating that the user terminal 200 is located at a predetermined specific location (for example, a mart, or market) or a signal indicating that the user terminal 200 is connected to a predetermined specific website (for example, an online food shopping mall), the refrigerator 100 may transmit the storage status information about the food to the user terminal 200, to thereby allow the user to purchase the food while checking the storage status information about the food displayed on the user terminal 200.

In an alternative embodiment, when a selection of one or more foods displayed on the display 161 and/or the user terminal 200 is made, the refrigerator 100 may provide a recipe for a dish that can be made using the selected food, and may provide information on cooking equipment which may be used in the home according to the recipe.

In an alternative embodiment, the refrigerator 100 provides information to be used for preheating cooking equipment, to thereby allow the refrigerator 100 to preheat the cooking equipment (for example, an electric oven 500 or a microwave oven 600) via the network 400.

In an alternative embodiment, the refrigerator 100 may provide health and beauty information, music, news, and traffic information to the display 161 and/or the user terminal 200.

In an alternative embodiment, the refrigerator 100 may provide predetermined information for providing a messenger notification, playing a YouTube video, or playing music that the user enjoys, and may provide weather information from a weather server (not shown) in response to an utterance of the user such as "How's the weather today?".

The embodiments of the present disclosure described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

As used in the present application (especially in the appended claims), the terms 'a/an' and 'the' include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example", "such as") used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof. It should be apparent to those skilled in the art that various substitutions, changes and modifications which are not exemplified herein but are still within the spirit and scope of the present disclosure may be made.

The present disclosure is thus not limited to the example embodiments described above, and rather intended to include the following appended claims, and all modifications, equivalents, and alternatives falling within the spirit and scope of the following claims.

What is claimed is:

1. A method for operating a refrigerator, the method comprising:
performing, by a controller, a first recognition of a first food being placed into the refrigerator;
performing, by the controller, a second recognition of a second food being taken out from the refrigerator; and
displaying, on a display of the refrigerator, storage status information on remaining food in the refrigerator based on a result of the first recognition and a result of the second recognition,
wherein the performing of the first recognition comprises:
sensing opening of a door of the refrigerator;
urging a user to open only one door, when a plurality of doors of the refrigerator have been opened;

recognizing the first food;
sensing that all doors of the plurality of doors of the refrigerator have been closed; and
determining information on a location of the first food in the refrigerator according to a location of a door of the plurality of doors of the refrigerator that was last closed in the refrigerator.

2. The method of claim 1, wherein the performing of the first recognition comprises:
upon sensing opening of the one door of the refrigerator, activating an image recognition function and a voice recognition function;
acquiring a photographed image of the first food;
estimating a type of the first food represented by the photographed image by using a first deep neural network which has been trained in advance to determine food types through images;
outputting a spoken utterance inducement signal when estimation of the type of the first food fails;
receiving a first spoken utterance signal relating to the type of the first food in response to the spoken utterance inducement signal;
recognizing the type of the first food represented by the first spoken utterance signal by using a second deep neural network which has been trained in advance to determine food types through voice;
sensing closing of the one door of the refrigerator; and
outputting information indicating that the recognized type of the first food has been stored in the refrigerator.

3. The method of claim 1, wherein the performing of the first recognition comprises:
acquiring a photographed image of the first food;
sensing closing of the one door the refrigerator; and
outputting information indicating that the first food has been stored in the refrigerator.

4. The method of claim 1, wherein the performing of the first recognition comprises:
outputting voice recognition function activation status information;
receiving a first spoken utterance of a user indicating that the first food is being stored in the refrigerator;
sensing closing of the one door of the refrigerator; and
outputting information indicating that the first food has been stored in the refrigerator.

5. The method of claim 1, wherein the performing of the second recognition comprises:
sensing opening of a door of the refrigerator;
receiving a second spoken utterance of a user indicating that the second food is being taken out from the refrigerator;
sensing closing of the door of the refrigerator; and
outputting information indicating that the second food has been taken out from the refrigerator.

6. The method of claim 1, wherein the performing of the second recognition comprises:
sensing opening of a door of the refrigerator;
acquiring a first image which is generated by photographing an inside of the refrigerator when the door of the refrigerator is opened;
sensing closing of the door of the refrigerator;
acquiring a second image which is generated by photographing an inside of the refrigerator after the door of the refrigerator is closed;
comparing the first image with the second image;
determining the second food has been taken out from the refrigerator, based on a comparison of the first image and the second image; and
outputting information indicating that the second food has been taken out from the refrigerator.

7. The method of claim 1, wherein the performing of the second recognition comprises:
sensing opening of a door of the refrigerator;
outputting voice recognition function activation status information;
receiving a second spoken utterance of a user indicating that the second food is being taken out from the refrigerator;
sensing closing of the door of the refrigerator; and
outputting information indicating that the second food has been taken out from the refrigerator.

8. The method of claim 1, wherein the displaying comprises displaying storage status information on the remaining food, including at least one among a storage location of the remaining food in the refrigerator, a list of the remaining food, and an elapsed number of days since the remaining food was initially stored.

9. The method of claim 1, wherein the displaying comprises displaying a list of the remaining food in which an elapsed number of days since the remaining food was initially stored are sorted in ascending or descending order.

10. The method of claim 1, wherein the displaying comprises:
receiving a signal indicating that a terminal registered by the refrigerator is located at a predetermined specific location or a signal indicating that the terminal is connected to a predetermined specific website by the controller communicating with the terminal; and
transmitting storage status information about the remaining food to the terminal.

11. The method of claim 1, further comprising, when at least one of the performing of the first recognition and the performing of the second recognition is completed, updating storage status information on the remaining food in the refrigerator.

12. A non-transitory computer readable storage medium, wherein, a computer program is stored in the computer readable storage medium, and the computer program, when executed by a processor, causes the processor to perform the method of claim 1.

13. A refrigerator for storing food, the refrigerator comprising:
a first recognizer configured to perform a first recognition of recognizing of a first food that is placed into the refrigerator;
a second recognizer configured to perform a second recognition of recognizing a second food that is taken out from the refrigerator; and
a display processor configured to display storage status information on remaining food in the refrigerator based on a result of the first recognition and a result of the second recognition,
wherein the first recognizer is configured to:
sense opening of a door of the refrigerator;
urge a user to open only one door, when a plurality of doors of the refrigerator have been opened;
recognize the first food;
sense that all doors of the plurality of door of the refrigerator have been closed; and
determine information on a location of the first food in the refrigerator according to a location of a door of the plurality of doors of the refrigerator that was last closed in the refrigerator.

14. The refrigerator of claim 13, wherein the first recognizer is configured to:

acquire a photographed image of the first food;
estimate a type of the first food represented by the photographed image by using a first deep neural network which has been trained in advance to determine food types through images;
output a spoken utterance inducement signal when estimation of the type of the first food fails; and
recognize the type of the first food represented by a first spoken utterance signal corresponding to the spoken utterance inducement signal by using a second deep neural network which has been trained in advance to determine food types through voice.

15. The refrigerator of claim 13, wherein the second recognizer is configured to:
acquire a first image which is generated by photographing an inside of the refrigerator when a door of the refrigerator is opened;
acquire a second image which is generated by photographing an inside of the refrigerator after the door of the refrigerator is closed;
compare the first image with the second image; and
determine the second food has been taken out from the refrigerator, based on comparison of the first image and the second image.

16. The refrigerator of claim 13, wherein the display processor is configured to display storage status information on the remaining food, including at least one among a storage location of the remaining food in the refrigerator, a list of the remaining food, and an elapsed number of days since the remaining food was initially stored.

17. The refrigerator of claim 13, wherein the display processor is configured to display a list of the remaining food in which an elapsed number of days since the remaining food was initially stored are sorted in ascending or descending order.

18. The refrigerator of claim 13, further comprising a communicator configured to communication with a terminal registered by the refrigerator,
wherein, when receiving, from the terminal, a signal indicating that the terminal is located at a predetermined specific location or a signal indicating that the terminal is connected to a predetermined specific website, the communicator is configured to transmit, to the terminal, storage status information about the remaining food.

* * * * *